United States Patent [19]

LeGrow

[11] Patent Number: 5,660,310

[45] Date of Patent: Aug. 26, 1997

[54] PORTABLE STORAGE UNIT AND A COOLER FOR VEHICLES

[76] Inventor: Mary K. LeGrow, 305 Jefferson St., Emporia, Va. 23847

[21] Appl. No.: 653,051

[22] Filed: May 28, 1996

Related U.S. Application Data

[63] Continuation-in-part of Ser. No. 529,240, Sep. 15, 1995, which is a continuation-in-part of Ser. No. 201,007, Feb. 24, 1994, abandoned.

[51] Int. Cl.$^6$ ...................................................... B60R 7/04
[52] U.S. Cl. ...................... 224/275; 224/926; 296/37.15; 62/372; 62/457.1; 62/463
[58] Field of Search ................................ 224/148.1, 148.3, 224/148.4, 148.7, 575, 576, 274, 275, 926; 296/37.1, 37.8, 37.15; 62/371, 372, 457.1, 457.7, 459, 463, 465

[56] References Cited

U.S. PATENT DOCUMENTS

| | | | |
|---|---|---|---|
| 1,369,367 | 2/1921 | Thomson | 62/463 |
| 2,138,885 | 12/1938 | Ross | 62/463 |
| 3,971,231 | 7/1976 | Derry | 62/457.1 |
| 4,026,351 | 5/1977 | Biava | 62/371 |
| 4,106,829 | 8/1978 | Dolle et al. | 224/275 |
| 4,515,421 | 5/1985 | Steffes | 62/457.7 |
| 4,545,211 | 10/1985 | Gaus | 296/37.8 |
| 4,721,237 | 1/1988 | Leslie | 224/148.3 |
| 5,095,718 | 3/1992 | Ormond et al. | 224/148.4 |
| 5,551,616 | 9/1996 | Stitt et al. | 224/926 |

*Primary Examiner*—Henry J. Recla
*Assistant Examiner*—Charles R. Eloshway
*Attorney, Agent, or Firm*—Nixon & Vanderhye

[57] ABSTRACT

A portable storage unit for a vehicle seat includes a generally rectilinear housing having a plurality of pull-out drawers and a fixed shelf with an overlying cover serving as a writing surface. The drawers and shelf may be compartmentalized to provide storage compartments for various articles such as pens, pencils, paper, and food articles, such as packets of condiments. The storage unit may have a beanbag-type flexible container secured along its bottom surface enabling the flexible container to conform to the contours of the vehicle seat such that the flexible container maintains the overlying housing in a stable, upright position on the seat. In another form, the cooler includes a housing having an insert for containing a cooling medium and a door for selective access to a cooling chamber defined by the insert. The insert is removable for purposes of replenishing the cooling medium. The cooler has a strap for securing it behind of the front passenger seat back whereby the cooling chamber is accessible by the driver of the vehicle.

6 Claims, 14 Drawing Sheets

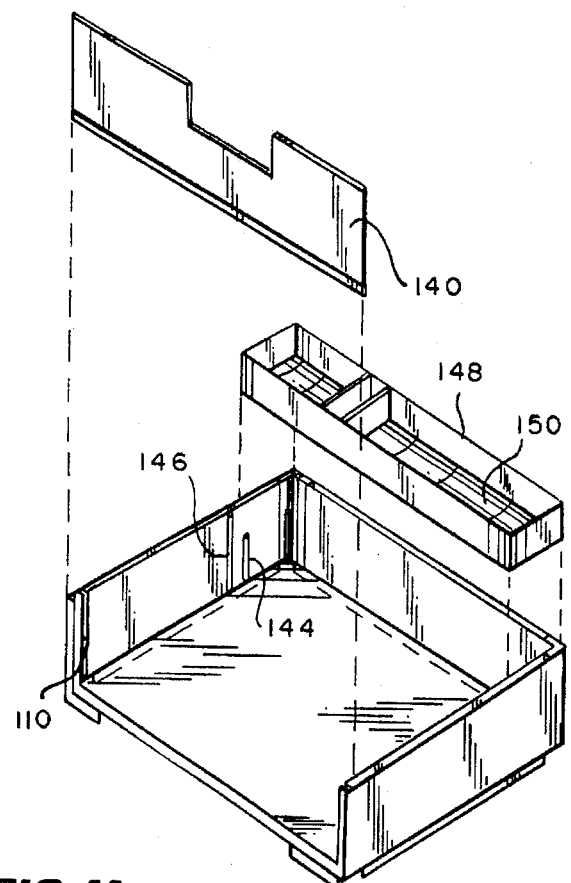
FIG. 11
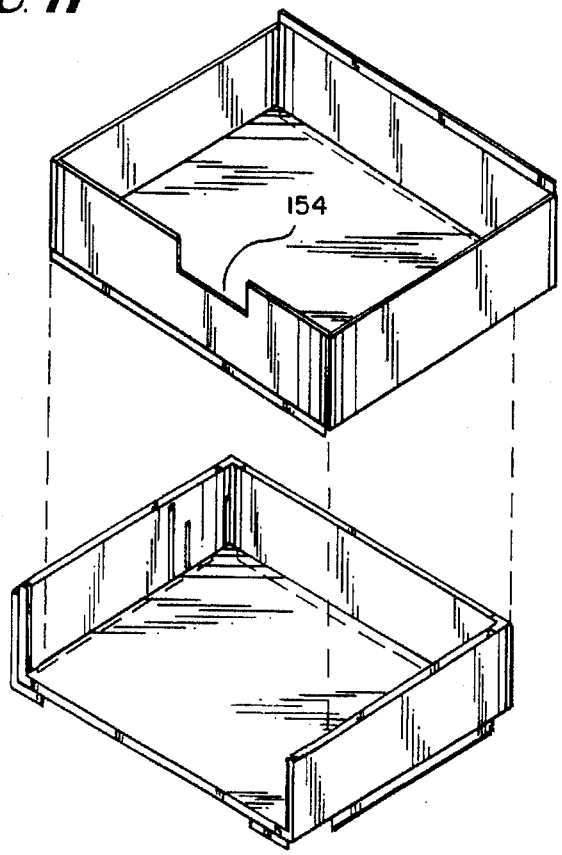

FIG. 12
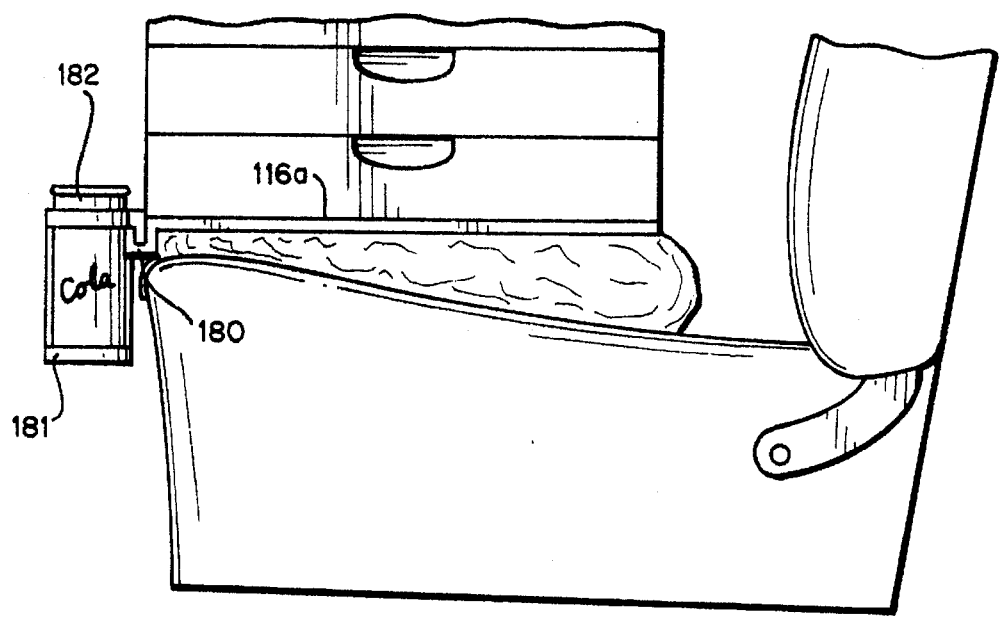
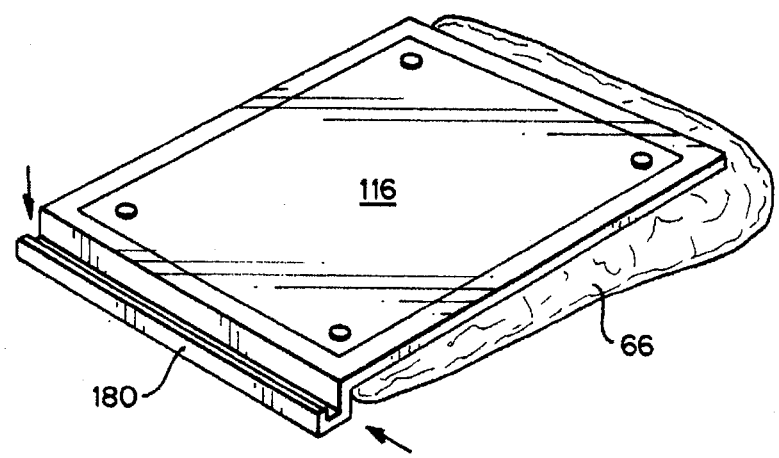
FIG. 12A
FIG. 12B
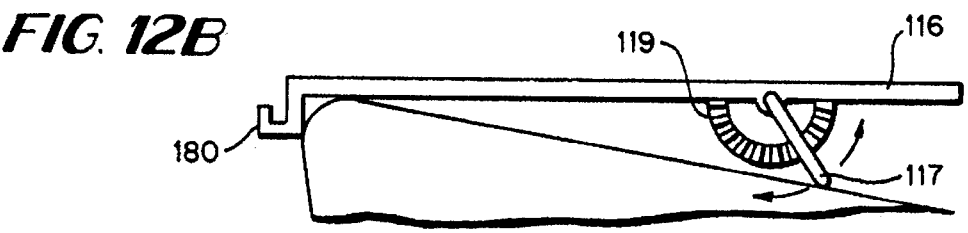

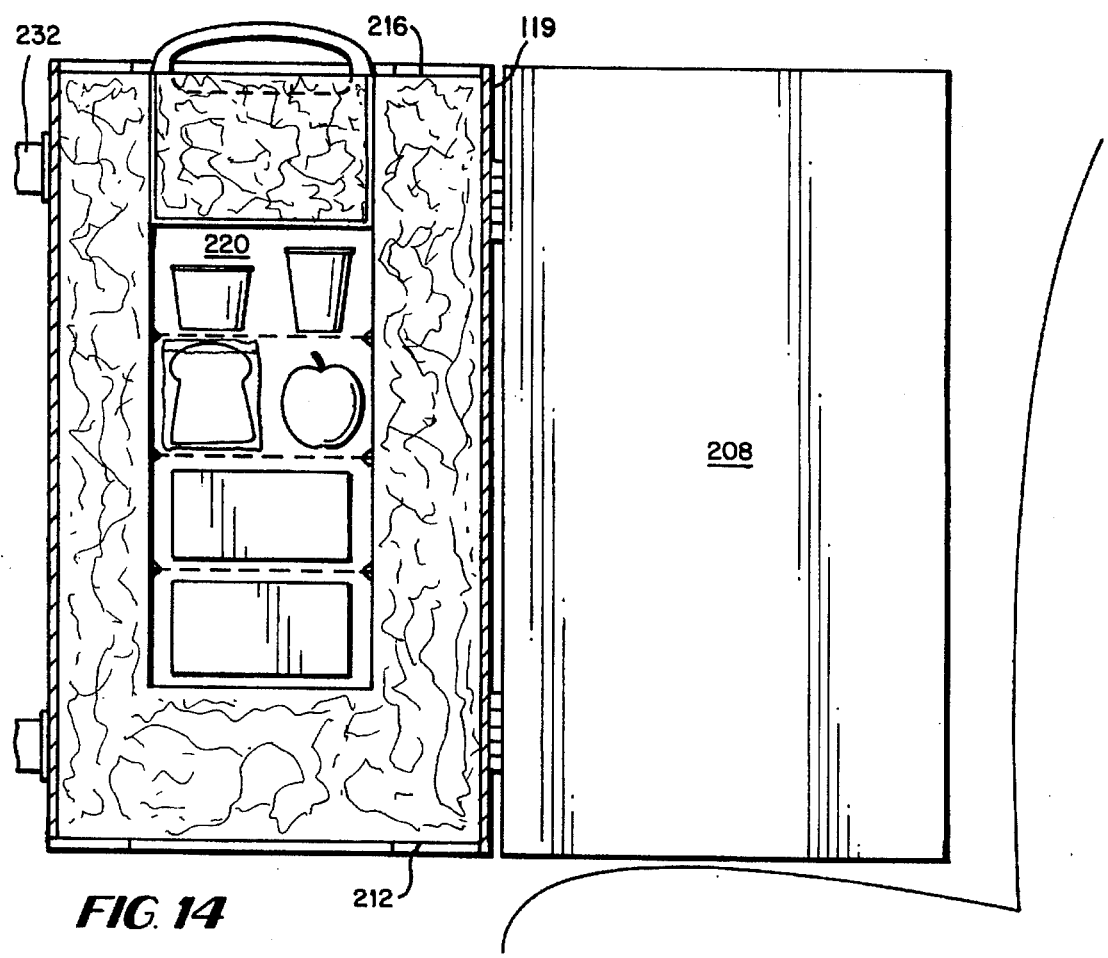

PORTABLE STORAGE UNIT AND A COOLER FOR VEHICLES

RELATED APPLICATIONS

This application is a continuation-in-part of application Ser. No. 08/529,240, filed Sep. 15, 1995, which in turn is a continuation-in-part of application Ser. No. 08/201,007, filed Feb. 24, 1994, now abandoned, the disclosures of both of which are incorporated herein by reference.

BACKGROUND AND SUMMARY OF THE INVENTION

The present invention relates to a portable storage unit for disposition on a vehicle seat and particularly relates to a portable storage unit having various article-supporting areas, for example, one or more shelves or drawers to meet various needs and requirements of an individual driving the vehicle. The present invention also relates to a portable cooler for use in a vehicle for cooling and storing commonly cooled and consumed food items and providing a readily available supply of ice cubes.

It is common for the driver of a vehicle to perform various tasks typically unrelated to the driving of the vehicle. Oftentimes the safety of the driver, any passengers and the vehicle are at risk while the driver performs these tasks. For example, a driver may require a writing surface to make a note, complete a form, or the like. Paper and a writing implement, such as a pen or pencil, may not be readily at hand in the vehicle, causing the driver to divert his attention from driving the vehicle to locating one or more of those items. Additionally, even after locating a writing implement and a sheet of paper, a flat, relatively hard surface is needed to enable the driver to write. This is generally unavailable in vehicles with standard interior configurations. Any such diversion of the driver's attention from the road can be a serious safety hazard. Further, storage for various articles in a vehicle is a common problem. While vehicles do have various types of standard storage compartments such as glove compartments and even built-in receptacles for receiving cassette tapes or a container for holding liquids, certain vehicles do not have these storage compartments or such variety of compartments to meet the driver's needs. For example, food items, particularly for long trips, require storage compartments accessible to the driver of the vehicle without diverting the driver's attention from driving the vehicle. Coin boxes, map compartments, trays for holding pens, pencils, note pads and other miscellaneous items such as sunglasses are often not located for convenient access by the driver.

Further, it is desirable to provide a cold storage or cooler for various food items particularly during extended trips in a vehicle. While many types of coolers are well known and can readily be carried within a vehicle, they are not often readily accessible, particularly by the driver of the vehicle. For example, the cooler may be placed on the back vehicle seat where it is virtually inaccessible by the driver absent stopping the vehicle. In any event, most coolers are not in a form which can be secured to the vehicle in a location accessible to the driver while driving the vehicle.

Additionally, the personal safety and security of the individual driving the vehicle is also a consideration. Many times, an individual alone in a vehicle can be placed in situations where the individual's safety may be at risk. Accordingly, there is a need for one or more security-type devices to assist in preventing such a prospective situation.

According to one aspect of the present invention, there is provided a portable storage unit for a vehicle which minimizes or eliminates the foregoing and other problems and provides a novel and improved portable storage unit comprised of a housing having various compartments or areas where articles may be placed and safely stored for access and use by the driver of the vehicle, and also which can be located on the vehicle's passenger or rear seat in a stable manner without positive securement to the seat. Various personal safety features may also be carried by the housing. More particularly, the housing includes side, end, bottom and top walls defining an enclosure in which various article-receiving compartments or areas may be disposed. In a preferred embodiment, the housing includes a top shelf having an overlying flat cover and, below the shelf, a pair of pull-out drawers. One or both of the pull-out drawers may have variously sized and configured compartments formed therein, for example, by employing removable inserts. One of the inserts may include a circular receptacle which, when the drawer is pulled out, provides a stable support for a container holding liquid. Other inserts may be particularly sized and configured to accomplish certain purposes, for example, to provide compartments for storing pens, pencils or paper, food items or CD's. One or more of the inserts may be removed from the drawers, affording storage for other items, e.g., phone books, papers, documents, office supplies and the like.

The cover on the housing preferably affords a flat upper surface providing a writing surface. Thus, when the housing is disposed in the passenger car seat, it serves as a readily and conveniently accessible writing surface for the driver. The cover may be removed and inserted in a vertical orientation into the housing unit for storage, rendering the top fixed shelf of the storage unit accessible to the driver. One or more fixed or movable shelf inserts may be located on the top shelf to compartmentalize it in whole or in part.

An important aspect of the present invention resides in the capability of the portable storage unit to be placed on the passenger front seat (or back seat) without positively securing the unit to the seat, but in a manner which imparts upright stability to the unit whereby the housing is supported substantially immovably on the seat. To accomplish this, the bottom side of the housing is provided with a flexible container containing weighted material movable within the container to enable the flexible container to conform to the various contours of vehicle seats such that the flexible container maintains the overlying housing in a stable, upright position on the seat. Preferably, the flexible container may comprise a beanbag having a flexible rubberized non-skid outer surface for high frictional contact with the seat.

The storage unit of the present invention may also be used to store devices useful for personal safety and security. For example, a ready driver-accessible compartment may be disposed along a side of the unit for receiving a flashlight, Mace, or the like. Additionally, another compartment on the unit may house a mannequin which can be either inflated or otherwise enlarged to simulate the appearance of an individual sitting in the passenger seat. Thus, the mannequin would be visible from outside of the vehicle and, to that extent, may offer some security to the lone driver of the vehicle. Also, a simulated or actual telephone handset may be disposed in a housing compartment readily accessible to the driver such that the driver may simulate a telephone call from the driver's seat thereby enhancing the driver's security and safety.

In a further embodiment of the present invention, the storage unit housing may comprise a plurality of stacked trays, each tray having a bottom wall, side walls and an end wall. The trays are provided with interfitting elements such that, when stacked, the trays are prevented from lateral movement relative to one another. In a preferred form, the interfitting elements comprise downwardly extending tabs along the lower edges of the side and end walls for reception in upwardly opening grooves or slots along the upper edges of the corresponding side and end walls. Drawers, similar to those described previously, with one or more of the various inserts also described previously, may be provided for reception within the trays of the stack. It will be appreciated that the stack of trays may comprise two or more trays with a corresponding or lesser number of drawers for each tray. The uppermost tray in the stack of trays is preferably covered with a flat panel forming a writing surface. Thus, it will be appreciated that the trays may be lifted from the stack individually or in groups, depending upon the number of trays.

A base platform is secured to the flexible container and serves as a base for the stack of trays. The base platform includes upwardly opening grooves or slots for receiving the downwardly projecting tabs of the lowermost tray of the stack of trays so that the stack of trays cannot move laterally relative to the flexible container. A carrying case in the form of a web of cloth or synthetic material may be disposed between the basic platform and the lowermost tray of the stack of trays. End portions of the carrying case may then overlie the sides of the stacked trays and terminate in handles whereby the entire stack of trays may be removed from the base for carrying outside of the vehicle.

In a further preferred form of the present invention, a cooler is provided for location behind and securement to the seat back of the passenger seat of the vehicle. The cooler is thus located such that its door can be opened by the vehicle driver while seated in the driver's seat, thereby gaining access to various shelves and an ice bucket contained within the cooler without diverting due attention to the road while driving. The cooler is preferably disposed in an outer housing which can be secured to the seat back. For example, in a preferred embodiment, a strap passes through suitable loops on the housing and about the top portion of the passenger's seat back to secure the cooler in position behind the passenger seat. A lower stand, case or a bean bag similar to the bag under the storage compartment previously described may be disposed below the housing on the vehicle floor such that the cooler door opens at an elevation slightly above the elevation of the back seat to permit the door to open fully. Alternatively, in addition to the securement of the cooler to the top of the seat back, the lower portion of the cooler may be secured directly to the passenger seat by extending a strap from hooks on the lower portion of the housing about the passenger seat such that the housing is suspended from the passenger seat back and accessible by the vehicle driver from the driver's seat. A further feature of the cooler includes an insert for receiving a cooling medium and which cooling medium can be readily and easily replenished. For example, the insert may comprise a generally U-shaped compartment removable from the housing through the open door of the cooler. The side walls of the insert are spaced one from the other and define a cooling chamber for receiving, for example, ice cubes as a cooling medium and which ice cubes can be readily replenished during a stay at motels or the like. This is a superior method because large frozen liquid blocks need to be refrozen at night. This is not practical on an extended car trip. The insert also carries a plurality of shelves which can be withdrawn and also carries an ice bucket for containing loose ice cubes. With the housing having walls with thermal insulating material, and along the door, it will be appreciated that the insert may be disposed within the housing to provide a cooling chamber for the articles carried on the shelves, i.e., food articles requiring cooling, as well as for ice cubes. By virtue of the location of the cooler behind the passenger seat of the vehicle and the orientation of the door, the contents of the cooler are readily accessible to the driver.

In a preferred embodiment according to the present invention, there is provided a portable cooler for use in a vehicle comprising a housing having opposite side walls, rear, bottom and top walls and a door pivoted thereto for movement between positions opening and closing the housing, a cooler compartment within the housing having a plurality of storage areas, a cooling medium container defining a cooling chamber between the housing side walls and the compartment for receiving a cooling medium, the container having an opening for receiving the cooling medium and means disposed between the cooler compartment and the housing for thermally insulating the cooler compartment, the housing having at least one fastener for facilitating securement of the housing to a vehicle seat.

Accordingly, it is a primary object of the present invention to provide a novel and improved portable storage unit for a vehicle seat for storing and accessing various articles from time to time as needed or required by the driver of the vehicle and also affording improved personal safety and security as well as a novel and improved cooler for a vehicle disposed for ready access by the vehicle driver.

BRIEF DESCRIPTION OF THE DRAWINGS

FIG. 11 is a view similar to FIG. 10 illustrating a removable panel for the uppermost tray;

FIG. 12 is a fragmentary side elevation view of the lower portion of the storage unit illustrating a hook arrangement for supporting a can holder or litter bag;

FIG. 12A is a perspective of the base of the storage unit showing the hook;

FIG. 12B is a schematic side elevational view of an alternate format support for the storage unit;

FIG. 14 is a view similar to FIG. 13 illustrating the door of the cooler in an open position;

DETAILED DESCRIPTION OF THE DRAWINGS

Figure 1:
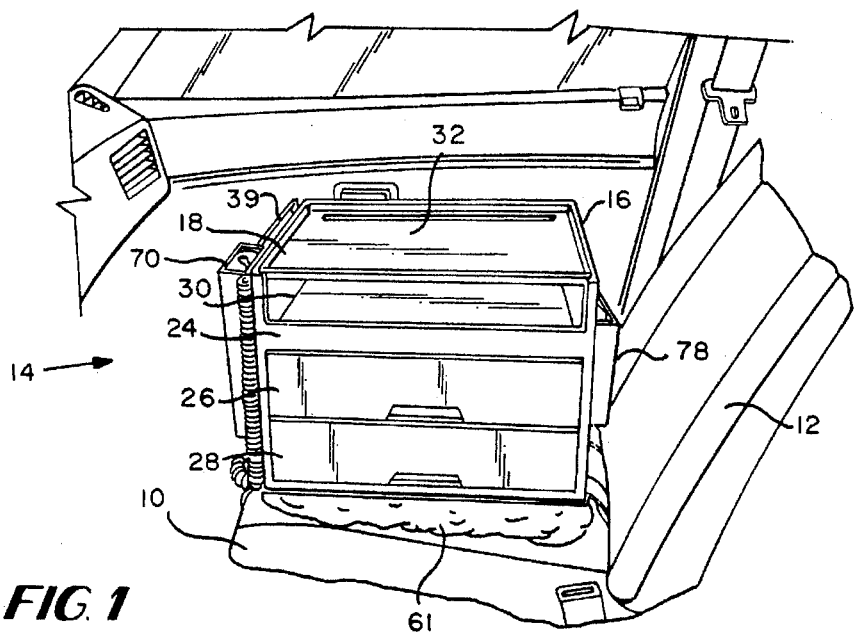
FIG. 1 is a fragmentary perspective view of the interior of a vehicle illustrating the passenger side seat with a portable storage unit disposed on the seat in accordance with the present invention.

Referring now to the drawings, particularly to FIG. 1, there is illustrated, as viewed from the driver's side of a vehicle, the interior of the vehicle's passenger side having a passenger side seat 10 and seat back 12, with a portable storage unit, generally designated 14, constructed in accordance with the present invention, situated on the seat 10 adjacent the driver of the vehicle. The portable storage unit includes a housing 16 having top, bottom, side and end walls 18, 20, 22 and 24, respectively (see FIG. 4). While the housing 16 is illustrated as being generally rectilinear in form, it will be appreciated that other external configurations of the housing may be provided without departing from the scope of the present invention. The housing, together with the drawers, shelf and cover, as well as the inserts for the drawers and shelf, as noted below, are preferably formed of a substantially rigid plastic material, affording strength and stability to the structure, although other materials achieving those ends may likewise be used.

Figure 4:
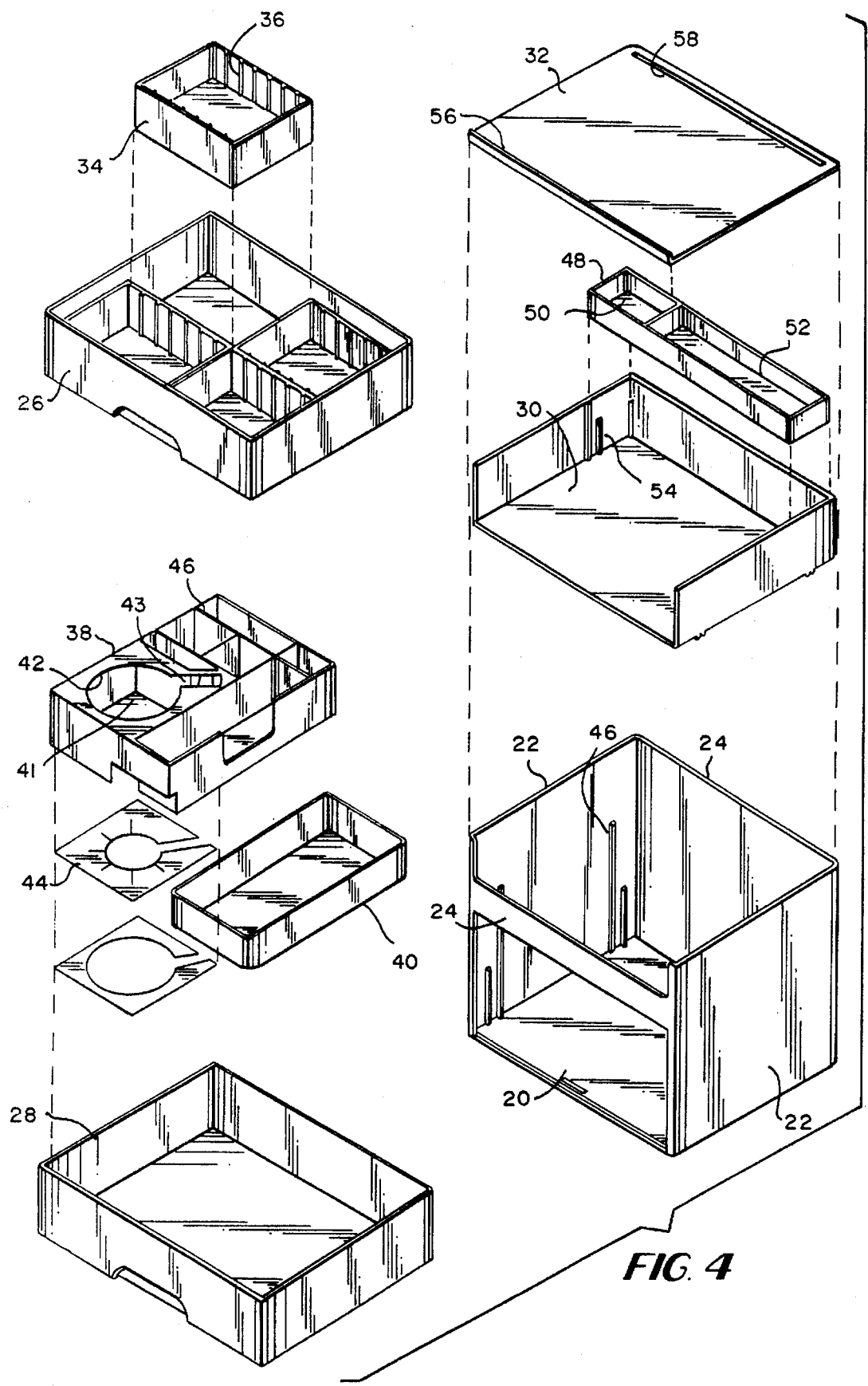
FIG. 4 is an exploded perspective view of the various parts forming the portable storage unit hereof.

In a preferred form of the invention as illustrated, there are provided upper and lower pull-out drawers 26 and 28, respectively, and an upper shelf 30 underlying a cover 32. The upper and lower pull-out drawers are best illustrated in FIG. 4. As illustrated, either one or both of the drawers 26 and 28 may be compartmentalized, for example, by employing compartment inserts. Thus, referring to FIG. 4, upper drawer 26 may have a series of discrete compartments 34 formed by generally rectilinear box-like inserts 34. The inserts may be sized and arranged to completely fill or only partly fill the top drawer 26. One form of an insert may have ridges 36 along front and back sides to define grooves for receiving the margins of audio cassettes whereby the one or more inserts may provide storage for audio cassettes.

As illustrated, the lower drawer 28 likewise contains inserts 38 and 40. The insert 38 may be multi-compartmentalized and include a receptacle 41 having a circular opening 42 adjacent a top surface thereof for receiving a container holding a liquid, for example, a coffee cup, a slot 43 for the handle of the coffee cup being illustrated. A rubberized expandable grip 44 may be disposed along the margin of opening 42 for gripping containers in the drawer. Other compartments 46 may be formed in the insert 38 for receiving various articles, such as packets of artificial sweetener, sugar, salt, pepper and the like. The other removable insert or tray 40 may be elongated and thereby provide a tray for utensils or straws or any other desired article. One of the inserts, for example, insert 40, may comprise a lift-out lap tray with a non-skid undersurface and sides. Thus, the driver can remove the lap tray from the drawer and place it on his/her lap, e.g., to facilitate eating while driving.

As best illustrated in FIG. 4, the drawers 26 and 28 may be disposed for sliding movement within the housing by any suitable means such as tracks containing rollers or ribs, not shown, projecting inwardly from the side walls of the housing. Any suitable means may be provided to retain the drawers in a closed position, while providing only a nominal resistance to opening the drawers. Stops at the rear ends of the drawers are provided to prevent the drawers from being accidentally totally removed from the housing when opened to their maximum extent. A drawer divider 29 may be disposed between drawers 26 and 28 and is preferably rigidly secured to the housing to reinforce and stabilize the housing.

Disposed above the drawers is a top shelf 30 which is supported, for example, on upstanding ribs 46 in the housing 16. While the shelf may or may not be compartmentalized similarly as with the drawers, the top shelf 30 may include a shelf insert 48 divided into compartments, for example, a coin compartment 50 and a compartment 52 for receiving elongated articles such as pencils and pens. The shelf insert 48 may rest on upstanding ribs 54 projecting inwardly from the side walls of the shelf 30. Shelf 30 may also form a permanent part of the housing 16 and, as such, would reinforce and stabilize the housing structure.

Figure 2:
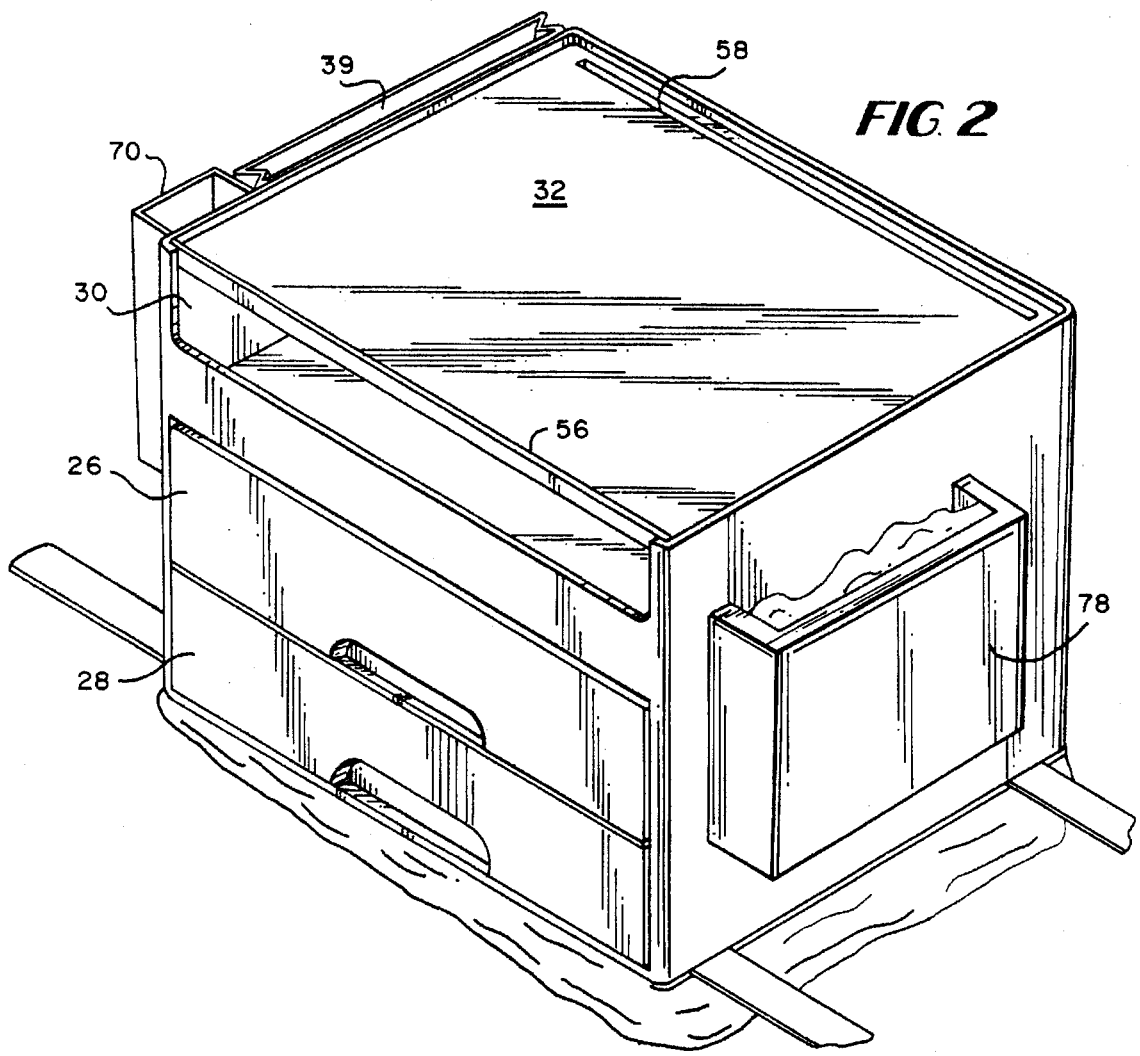
FIG. 2 is a perspective view of the portable storage unit hereof.

Top cover 32 is preferably flat and has a forwardmost upstanding lip 56 whereby articles such as pens or pencils will not roll off the forward edge of the cover. The cover is preferably slightly recessed within the top of the housing as illustrated in FIG. 2 whereby the upper edges of the side walls 22 and the rear wall 24 provide with the lip 56 upstanding projections to prevent papers or other items from sliding off while the vehicle is in motion. The cover 32 may be supported by the upper edges of the side walls of shelf 30. An elongated groove 58 may be provided in the surface of cover 32 adjacent its rear edge to define a receptacle for a pen or pencil, preventing the latter from rolling about the surface of cover 32 in response to movement of the vehicle. Thus, the upper flat surface of cover 32 provides a writing surface for the driver of the vehicle. The cover is removable from the unit 14 by lifting it from shelf 30. The shelf 30, as well as the drawers 26 and 28 in their closed position, terminate short of the back wall 24 of the housing, thereby defining a slot between the back wall 24 and the rear faces of the drawers and shelf and into which slot the cover 32 is received and stored. Further, the litter bag 39 may be secured to a side wall 22 which, when the unit is used, faces forwardly in the vehicle.

In order to provide a stable support for the storage unit 14 on the passenger side seat adjacent the driver (or in the back seat) and considering the different contours and sizes of various vehicle seats, there is provided in accordance with the present invention a flexible container 61 underlying and secured to the housing which is conformable with the various sizes and contours of vehicle seats. The container may be wholly enclosed or the bottom wall 20 of the housing 14 may provide the upper surface to the container. The container 61 is provided with weighted material which is movable within the flexible container to enable the container to conform to the different contours of various vehicle seats such that the flexible container maintains the overlying housing in a stable upright position on the seat. The weighted material may be in the form of shot shell, or other materials such as beanbag materials, whereby the container will conform to the shape of the seat. The material of the container 61 is preferably formed of a non-skid material such as rubber whereby, once placed on the seat with the movable material arranged to conform the flexible container to the contours of the seat, the housing is supported in an upright 'stable position on the seat.

Figure 3:
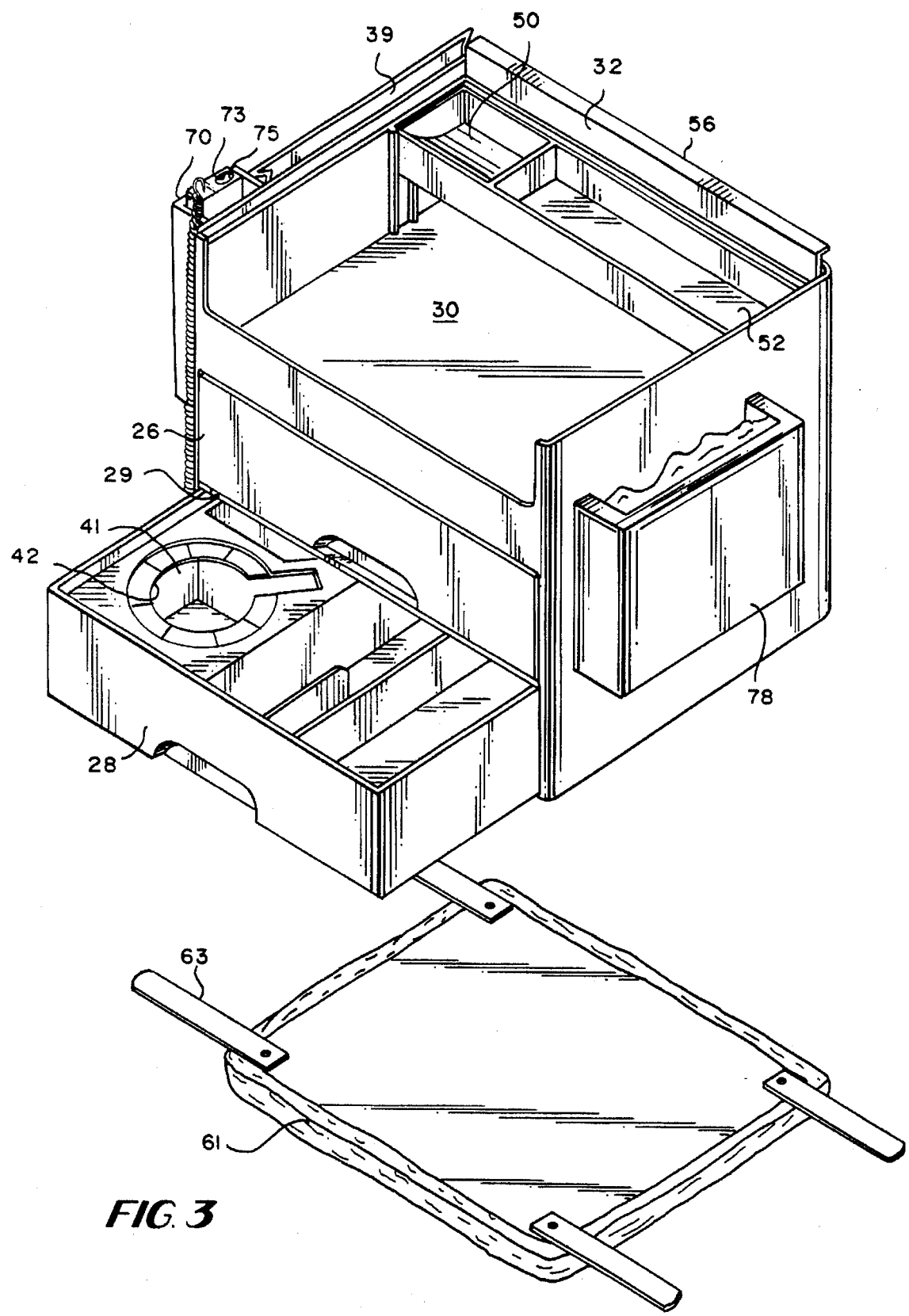
FIG. 3 is an exploded perspective view of the storage unit with its top cover removed, a drawer in an open position and illustrating the flexible container for stabilizing the unit on the seat.

Referring to FIG. 3, straps 63 may also be employed to secure the flexible container to the seat, for example, by using Velcro-type material. However, in a preferred embodiment, the beanbag-type flexible container fixed to the bottom of the housing is sufficient to support and stabilize the housing in an upright position as illustrated in FIG. 1.

Figure 5:
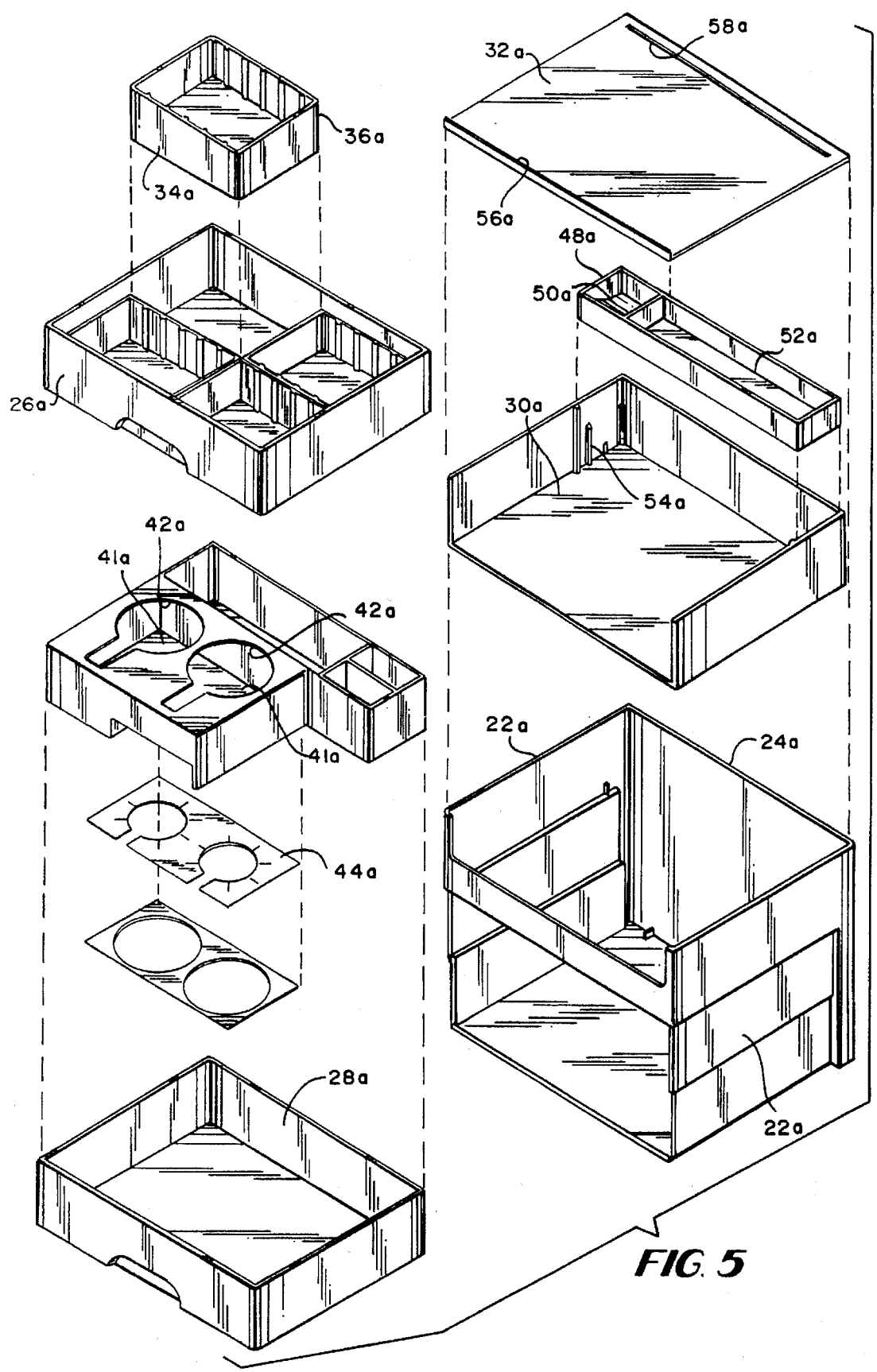
FIG. 5 is a view similar to FIG. 4 illustrating a further embodiment of the present invention.

It will be appreciated that other forms of the housing may be utilized. For example, as illustrated in FIG. 5 wherein like numerals are applied to like parts as in the preceding embodiment, followed by the letter suffix "a," the housing side walls 22a may be staggered inwardly in a descending order to provide upwardly projecting flanges for supporting the upper and lower drawers 26a and 28a. Inwardly directed ribs may be provided on the flanges to prevent the rear end of the drawers from tilting upwardly when the drawers are opened. Additionally, different types of inserts for the drawers are illustrated. For example, for the bottom drawer 28a, there is provided two receptacles 41 a having circular openings 42a and an expandable rubber gripper 44a for gripping liquid containers disposed in the bottom drawer 28a.

Figure 6:
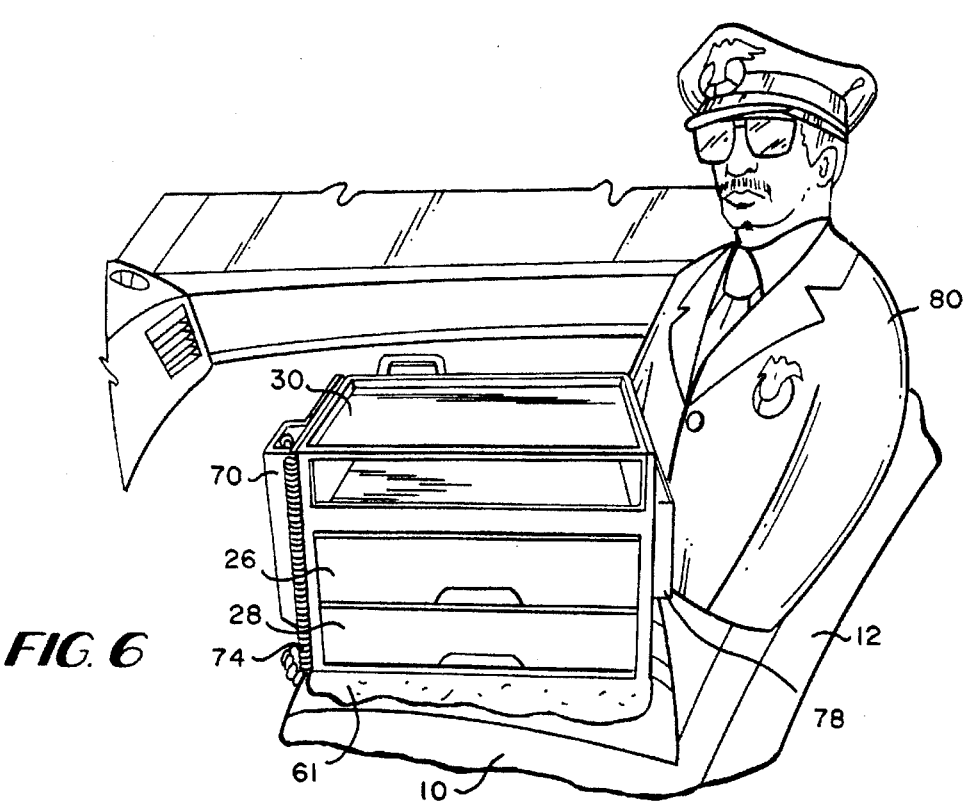
FIG. 6 is a view similar to FIG. 1 illustrating the unit hereof with a mannequin simulating a passenger in the vehicle's passenger seat.
Figure 7:
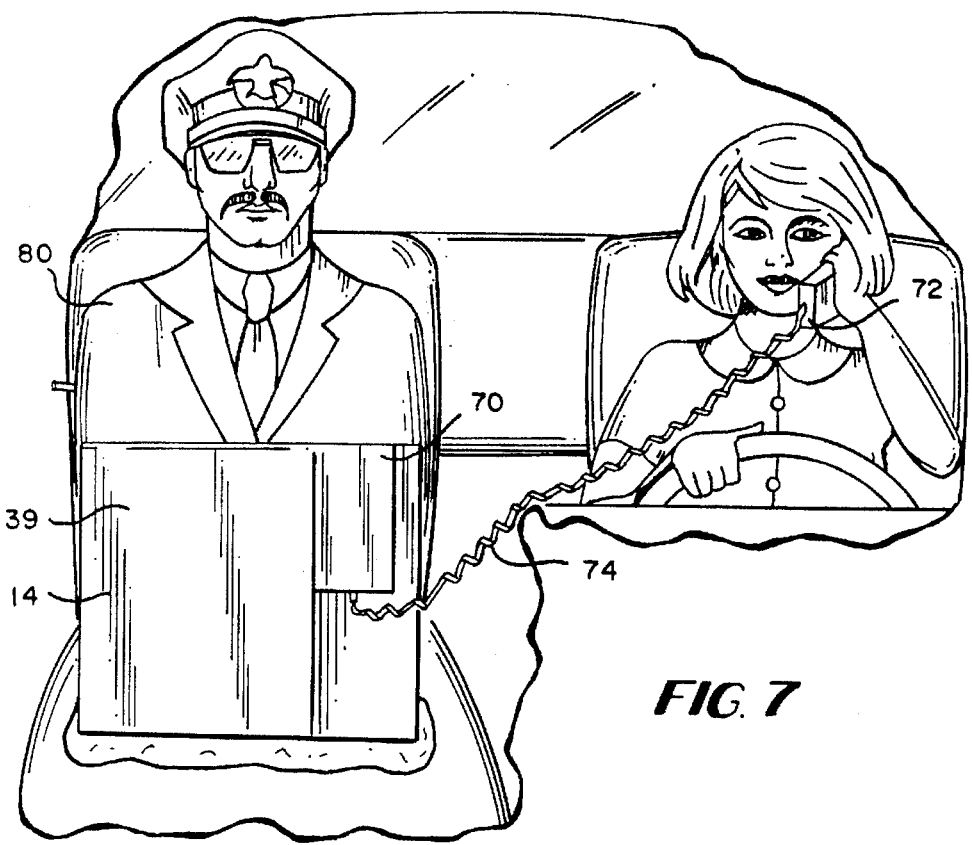
FIG. 7 is a front elevational view illustrating the driver, mannequin and storage unit hereof.

It will be appreciated that personal safety and security are prime consideration for a driver of a vehicle, particularly a driver alone in the vehicle. For that reason, there is provided, in another aspect of the present invention, certain personal safety articles provided on the storage unit. For example, and referring to FIGS. 6 and 7, projecting from the front side 22 of the storage unit 14, there is a holder 70 for a telephone handset 72. The handset 72 may comprise part of an actual telephone or it may be a simulated telephone handset. In each case, the handset has a cord 74, preferably coiled, connected at its distal end to the housing 70. Consequently, when the driver of a vehicle feels threatened, the telephone handset 72 may be removed from the receptacle 70 and held to the ear, simulating a call to the authorities. Where a simulated handset 72 is used, the handset per se may have a recess 73 for holding a protective spray such as a pepper Mace. Another safety aspect is the provision of a compartment 78 on the opposite side of the housing in which there is provided a mannequin 80. The mannequin may be of the inflatable type such that, when inflated, it may simulate the appearance of an individual having head and shoulders, as viewed from outside of the vehicle. The mannequin 80 may be manually inflated by the driver, for example, by the use of an elongated tube, with check valve, not shown. Likewise, the mannequin may comprise a liner shaped to the bodily shape of the shoulders and head of an individual when stuffed with a stuffing material such as cotton or newspapers, or a combination of stuffing materials. Thus, mannequin 80, when enlarged, projects above housing 16 and, as viewed from outside the vehicle, simulates the appearance of another individual in the vehicle with the driver.

The litter bag 39, the receptacle 70, and/or the compartment 78 may be permanently or releasably attached to the housing, for example, by hooks or spring clips attached to the bag, receptacle or compartment. Also, it will be appreciated that the inserts can be variously configured and arranged in the drawers in accordance with the nature of the articles to be carried or stored.

Figure 9:
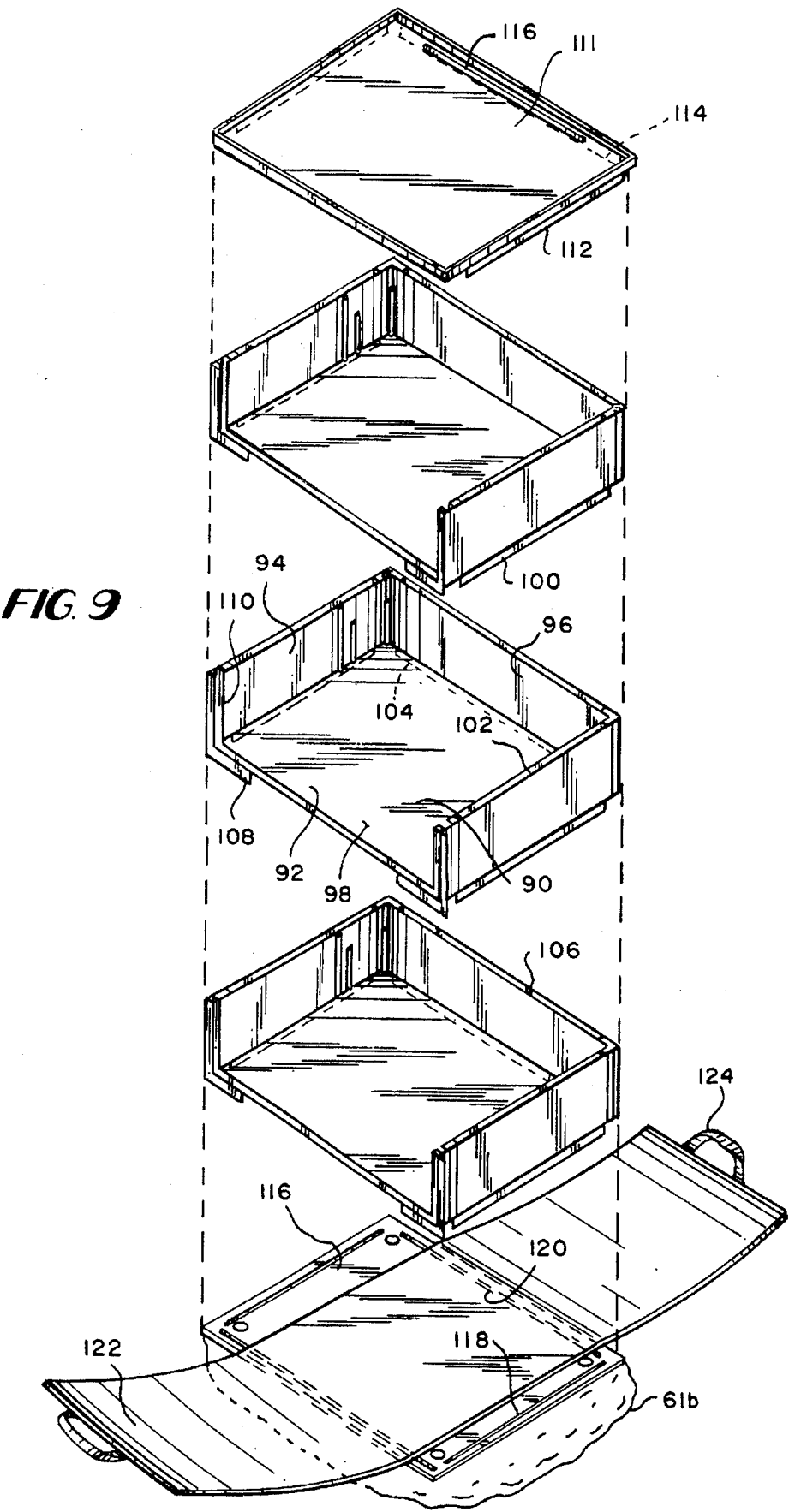
FIG. 9 is an exploded perspective view of stackable trays forming the housing of this further form of the present invention.

Referring now to the embodiment hereof illustrated in FIGS. 8–11, wherein like numerals are applied to like parts as in the previous embodiment, followed by the letter suffix "b", there is illustrated a housing including a plurality of trays 90 stacked one on top of another to provide a stack of trays. As best illustrated in FIG. 9, each tray 90 includes a bottom wall 92, opposite side walls 94 and an end wall 96. The trays preferably define an opening 98 opposite end wall 96 for receiving a drawer. Each of the trays includes elements for interfitting with another tray to maintain the trays in stacked relation to one another and prevent relative lateral movement thereof, while simultaneously enabling each superposed tray to be lifted from an underlying tray. Preferably, the interfitting elements include tabs 100 and grooves or slots 102. Thus, the lower edges of the sides 94 of each tray may have depending tabs 100 for reception in the upwardly opening grooves or slots 102 along upper edges of the corresponding sides of an underlying tray 90. Similarly, the lower edge of the end wall 96 may have a depending tab 104 for reception in an upwardly opening groove or slot 106 along an upper edge of the corresponding end wall 96 of an underlying tray 90. It will be appreciated that the tabs may project upwardly from the upper edges of the side and end walls for reception in downwardly opening grooves or slots along the lower edges of corresponding side and end walls of a superposed tray 90. The interfitting connections, of course, enable the trays to be lifted from an underlying tray, while the trays are locked against lateral movement relative to one another.

The front edge of the bottom wall 98 of each tray also has a depending tab 108. When the trays are superposed, the depending tab 108 provides a stop for a drawer disposed in the underlying tray, as explained hereinafter. While the depending tabs 104 and 108 may extend the entire width of the trays, preferably the depending tabs 104 and 108 comprise discrete tabs located adjacent the side walls 94, leaving the central portion of the bottom wall 98 clear. Additionally, the front margins of the side walls 94 have grooves or slots 110 extending vertically, for reasons which will become apparent.

As illustrated in FIG. 9, a cover 111 is provided for the stacked trays 90. Preferably, the cover 111 is flat but may have an upstanding lip about its periphery as in the previous embodiment whereby articles such as pens or pencils will not roll off the edges of the cover 111. Similarly as each tray 90, the cover 111 has downwardly projecting tabs 112 along its opposite sides and one or more depending tabs 114 along its rear edge for engaging in corresponding upwardly opening grooves or slots 102 and 106 of the side and end walls of the underlying tray similarly as each tray has tabs engaging in the grooves or slots of an underlying tray. An elongated groove 116 may be provided in the surface of cover 111 adjacent its rear edge to define an receptacle for a pen or pencil as in the prior embodiment. The flat surface of cover 111 provides a writing surface for the storage unit and is removable from the unit by lifting it from the uppermost tray 90. The undersurface of the cover 111 may have one or more pocket arrangements for receiving and holding cards, envelopes, pencils and the like.

To provide a stable support for the stacked trays 90, a flexible container 61b is provided to underlie the stack. The container 61b is similar to the container 61 of the prior embodiment and contains weighted material to enable it to conform to the different contours of the various vehicle seats so that the flexible container 61b maintains the overlying stacked trays in a stable, upright position on the seat. To couple the stacked trays to the flexible container 61b, a base connection or platform 116 is secured to the top of the flexible container 61b. While a planar platform 116 is illustrated, it will be appreciated that the platform need not be continuous but, rather, may be discontinuous in the form of brackets secured to the container 61b. The platform 116 has as interfitting elements a pair of upwardly opening grooves or slots 118 along opposite sides thereof and an upwardly opening groove or slot 120 adjacent the opposite ends of the platform 116. These grooves receive the downwardly projecting tabs 100, 104 and 108 of the lowermost tray 90 of the stacked trays, thereby preventing lateral movement of the stacked trays relative to flexible container 61b, yet enabling the stack of trays to be removed from the base platform 116 and flexible container 61b.

A feature of this aspect of the present invention resides in the provision of a carrying case for carrying the stacked trays. For example, the driver may wish to carry the contents of the trays and drawers from the vehicle with the assurance that the stacked trays will not become separated one from the other. To that end and with reference to FIG. 8, a carrying case comprising a flexible element 122 may be disposed between the platform 116 and the lowermost tray 90 and in the central planar portions of the lowermost tray 90. That is, the tabs 104 and 108 on the opposite ends of the trays may be spaced one from the other to permit the insertion of the flexible carrying case 122 between the tabs whereby the side and end tabs may be received in registering grooves or slots of the platform 116. The carrying case 122 may comprise a strip of flexible material, such as cloth or canvas, or may be formed of a flexible synthetic material. Case 122 has opposite side portions which, when engaged, may extend along the opposite sides of the stacked trays, terminating in handles 124 at opposite ends whereby the stacked trays and drawers may be easily and readily lifted from the platform 116. Alternatively, a zippered carrying case may be provided with top and front panels zippered to side panels. In this way, the drawer or drawers may be pulled out through the opening in the case when the front panel is unzipped. Also, the flat writing surface may be exposed by unzipping the top panel.

Figure 8:
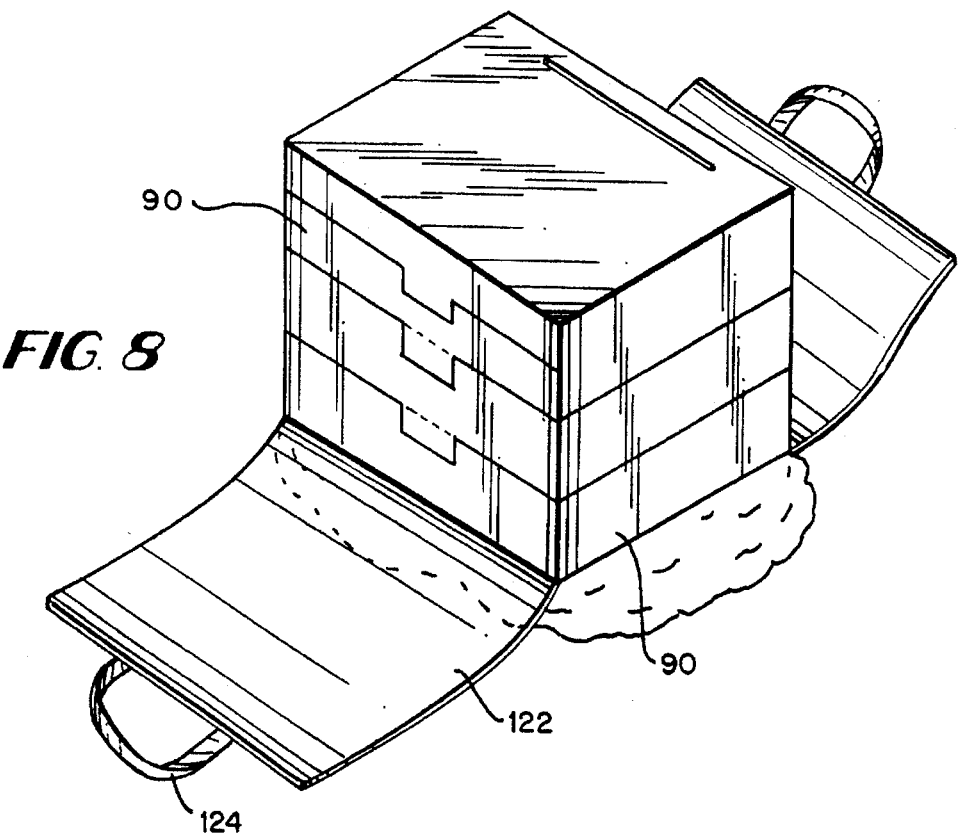
FIG. 8 is a perspective view of a further form of portable storage unit including stackable trays according to the present invention.
Figure 8A:
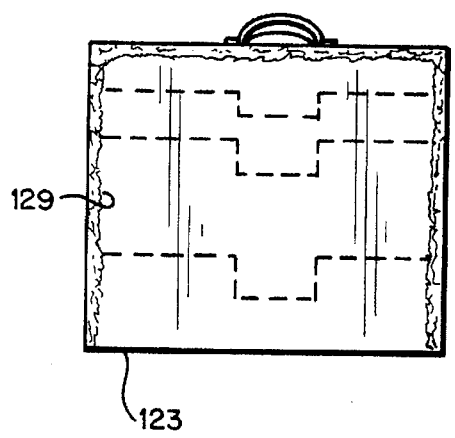
FIG. 8A is a front elevational view of a carrying case for the portable storage unit hereof.
Figure 8B:
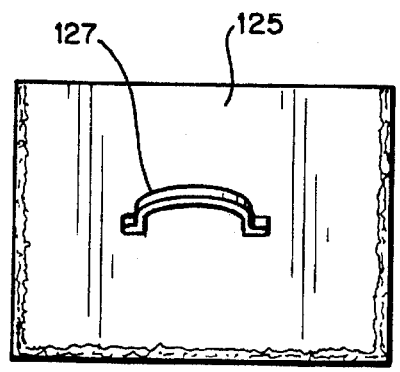
FIG. 8B is a plan view of the carrying case illustrated in FIG. 8A.

Referring to FIGS. 8A and 8B, there is illustrated a further form of carrying case for carrying the stacked trays. In this form, the carrying case 123 may comprise side, end, front and back and top and bottom wall portions defining a volume in which the stacked trays may be placed. For access to the volume defined by the carrying case 123, the front and top walls may have a zippered closure 125, the handle 127 being disposed on the zippered closure along the top wall of the case 123. As illustrated, the zipper 129 extends along the opposite edges of the front wall and along the top wall and across the top wall adjacent the rear wall. Thus, by unzipping the zipper, the stacked trays may be disposed in or moved from the casing 123.

Figure 10:
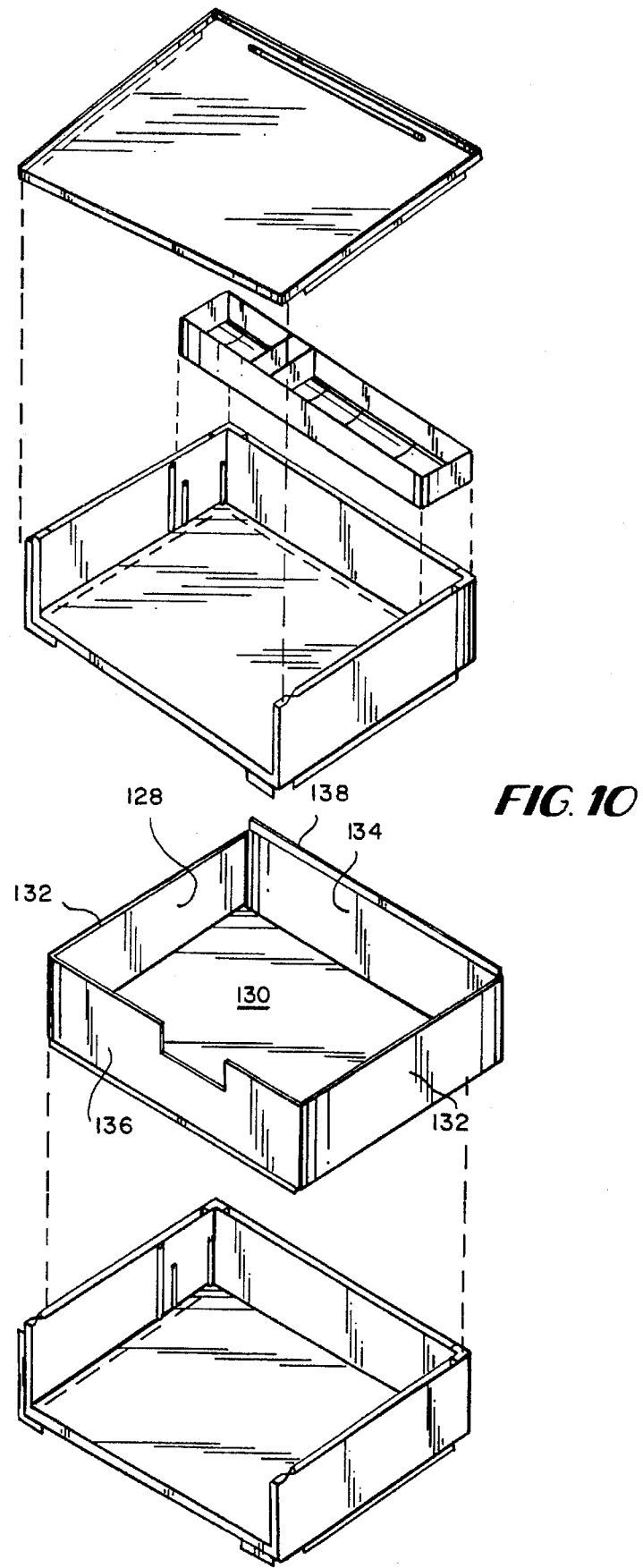
FIG. 10 is an exploded perspective view of a pair of trays of this further form with a drawer in one tray and an insert in the other tray, together with an overlying cover.

It will be appreciated that the stacked trays 90 form receptacles for receiving one or more drawers 128. The drawers 128 are illustrated in FIGS. 10 and 11. Thus, each drawer may comprise a bottom wall 130, side walls 132 and end walls 134 and 136. The drawers do not require runners or glides, although they may be used, and may simply be disposed in the open ends of the trays. The rear end wall 134 of each drawer has an upstanding lip 138 serving as a stop for engaging the depending stop 108 of the superposed tray 90 so that the drawer will not be pulled out from the stacked trays. The drawers may be compartmentalized, for example, by employing the compartment inserts illustrated in FIGS. 4 and 5 of the previous embodiment. Thus, each of those inserts may be disposed in one or more of the drawers as desired. Thus, for example, inserts for cassette tapes or for holding liquids, for example, a coffee cup, may be provided the drawers 128, all as described in the previous embodiment.

Referring now to FIG. 11, a cover 111 for the uppermost tray need not be provided while the stacked trays still provide a writing surface. To accomplish this, a side panel 140 may be provided and slidably received in the grooves 110 along the opposite sides of the uppermost tray. The side panel 140 thus serves to retain any articles which may be placed in the uppermost tray. Alternatively, the side panel 140 may be removed. This leaves the bottom wall of the uppermost tray as a writing surface, for example, when the stacked trays face the driver of the vehicle. To facilitate its use as a writing table, each tray is provided with a plurality of projections or ridges 144 which terminate short of the upper edges of the trays. A further ridge 146 is provided each side of the tray to serve as a stop. Thus, a shelf insert 148 having an arcuate bottom wall 150 may be provided for resting on top of the upper ends of ridges 144 and between ridge 146 and the end wall of the tray. Thus, pencils and other writing implements may be carried by the insert 148.

It will be appreciated that the drawers may be provided with handles. Alternatively, the front walls of the drawers may be provided with cutouts as illustrated at 154 in FIG. 11 providing a handle for the drawers.

It will be appreciated that the trays 90 of the present invention are identical one to the other and, consequently, manufacture of the trays is greatly simplified. Thus, any one tray may be used at any position in the stack of trays, it being further appreciated that the stack of trays may comprise two or more of such trays. Note also that the carrying case need not be utilized at all and that the lowermost tray of the stack of trays may be interfitted directly with the base platform 116 without the interposition of the carrying case. It will also be appreciated that the housing hereof of both embodiments, and including the drawers, may be formed of plastic materials or other suitable materials as desired.

Referring to FIGS. 12 and 12A, the lowermost platform 116a disposed on the container 61 may have a forwardly projecting support along its forward edge in the shape of an elongated channel having an upturned flange 180. As illustrated in FIG. 1, the forward edge of platform 116 lies substantially in vertical alignment with the forward edge of the passenger seat. By locating a support or hook at that location, additional holders may be provided, for example, for holding a cup or a can or for an additional litter bag. For example, a can holder may comprise a substantially rigid container for containing a can having a rearwardly projecting inverted channel forming a flange or hook 182 for interfitting with the hook 180. The holder 181 may thus depend forwardly of the front passenger seat as illustrated in FIG. 12, wholly supported by the elongated hook 180. An additional litter bag similarly having a complementary hook-shaped portion along its rear side may be employed, making use of the space available in front of the passenger seat for additional storage areas.

Referring to FIG. 12B, a flap 117, preferably added, may be provided on the undersurface of platform 116 and adjusted relative to the slope of the seat to maintain the stacked trays generally horizontal relative to the passenger seat. This would be in lieu of the support for the stacked trays disclosed in the prior embodiments. The flap 117 may, for example, be comprised of a pivoted, padded, generally U-shaped wire pivotally depending from the platform 116 and detented into adjusted positions to accommodate the various slopes of the passenger seat. Brackets 119 may be provided along opposite sides of the platform 116 to provide the detenting action. The flap 117 is therefore adjustable in the directions of the arrows into detented positions.

Figure 13:
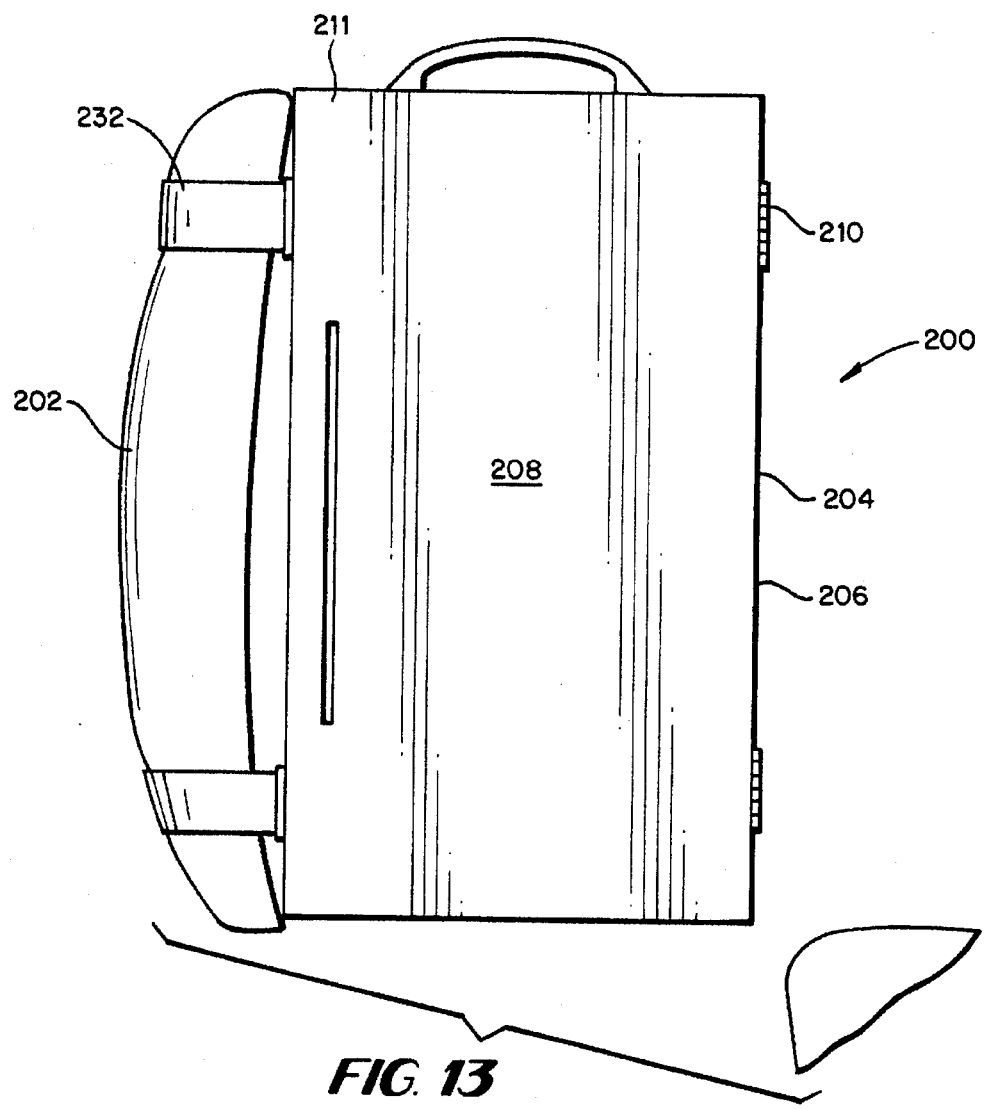
FIG. 13 is a fragmentary side elevational view of a cooler disposed behind the passenger seat back.

Referring now to FIG. 13, there is illustrated a cooler, generally designated 200, for securement behind the passenger side seat back 202 of a vehicle. The cooler 200 includes an external housing 204 comprised of side walls 206, a rear wall, a door 208 hinged at 210 to the rearmost side wall 206 (when the cooler is positioned in the vehicle) and top and bottom walls 211 and 212, respectively. The walls of the housing 204 are preferably formed with or have a layer of thermal insulating material.

Figure 16:
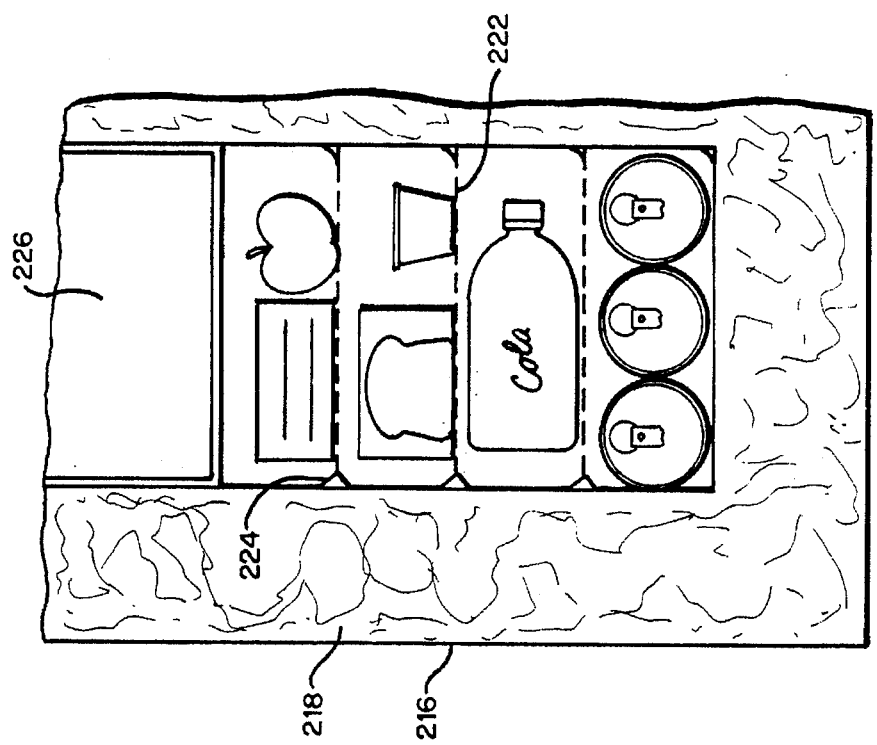
FIG. 16 is a fragmentary side elevational view of the insert within the cooler housing.
Figure 17:
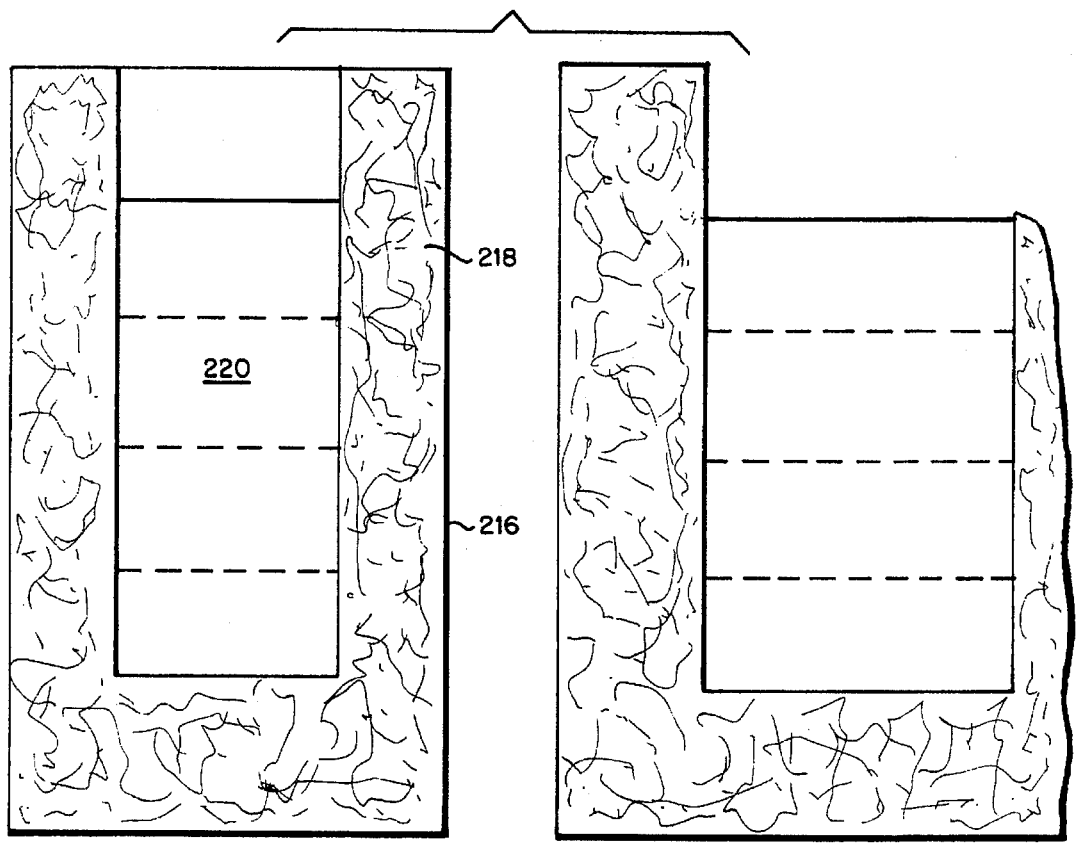
FIG. 17 is a front elevational view of the cooler insert.
Figure 18:
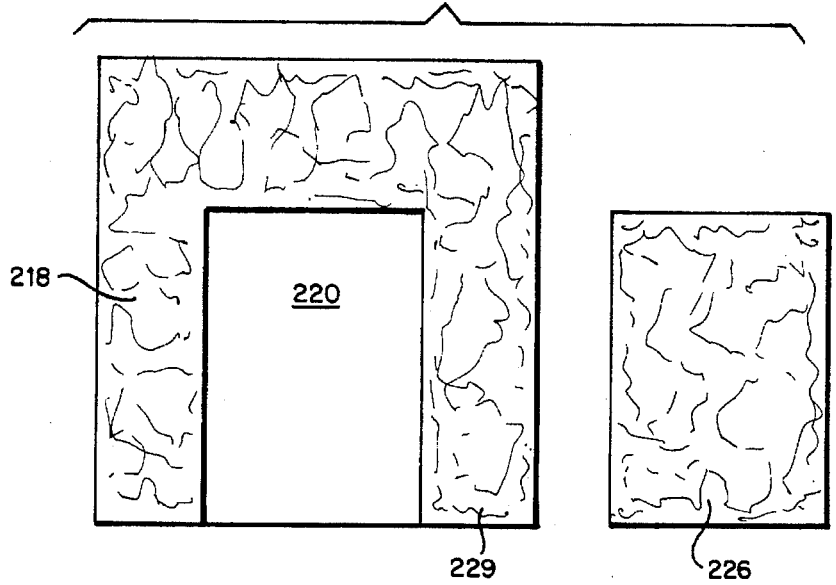
FIG. 18 is a top plan view of the insert.

Slidable within the housing 204 is an insert or coolant medium container 216 which defines a cooling chamber 218 (FIG. 16) for receiving a cooling medium. The insert 216 includes a pair of spaced walls on opposite sides of a compartment 220 for receiving articles to be cooled. The insert also includes spaced walls along the bottom, as well as spaced walls along the back of the insert defining the cooling compartment 220 and leaving it open only on the top and front. Thus, the insert is generally of a U-shaped configuration when viewed from the front and the top as in FIGS. 17 and 18, respectively, which defines the cooling chamber 220. The top of each of the legs of the insert is open so that, when the insert is removed from the housing 204, a cooling medium can be disposed within the insert. For example, ice cubes may be disposed through the open top of the insert to fill the volume of the insert surrounding the compartment 220. When the compartment is filled, the insert can be placed back into the housing and the door 208 shut. In this manner, the cooling compartment 220 is defined by cooled interior walls on its opposite sides, rear and bottom for cooling the compartment. With insulating material 119 on the top of the housing and the door, the compartment 220 will remain cool. The forward walls 229 (FIG. 18) of insert 216 in direct registration with the door 208 are preferably transparent such that the degree of melting of the cooling medium may be observed when the door 208 is opened.

The interior walls of the insert define supports for a plurality of superposed shelves 222 for storing individual articles within the cooler. The shelves may be disposed on support 224 racks within the cooling compartment for sliding movement outwardly of the compartment. Additionally, the shelves have upturned outer lips to retain articles on the shelves and prevent them from spilling or tipping over outwardly of the compartment once the door is opened. Additionally, an ice bucket 226 may be provided adjacent the top of the cooling compartment, thus rendering ice cubes readily available to the vehicle driver.

Figure 13A:
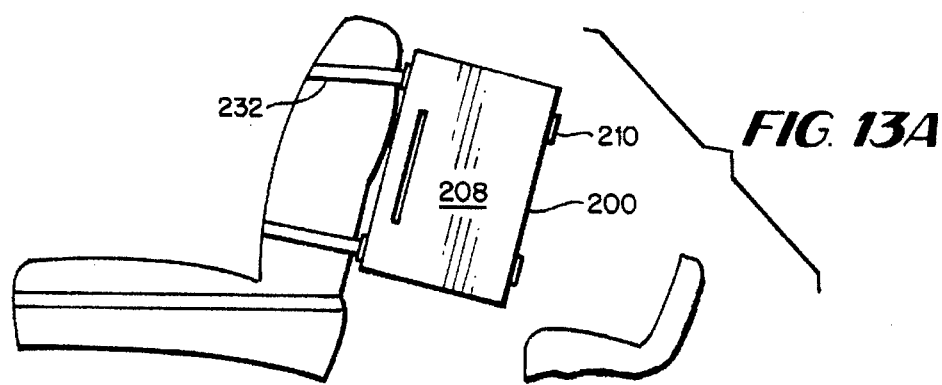
FIG. 13A is a view similar to FIG. 13 illustrating the cooler suspended from the seat back and passenger seat.
Figure 15:
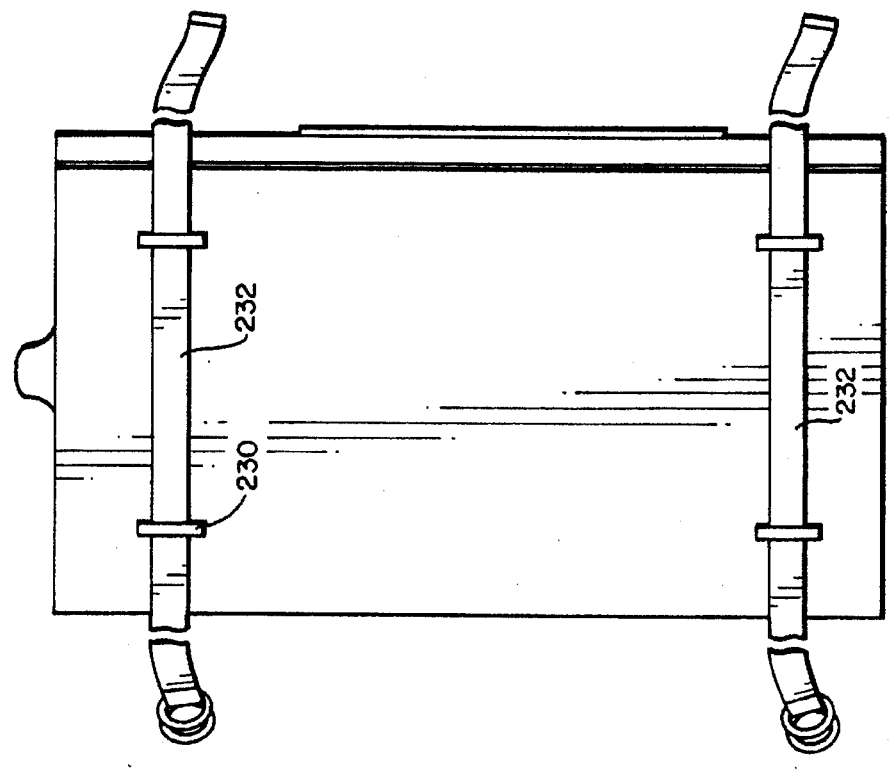
FIG. 15 is a front elevational view of the cooler illustrating the belts for securing it to the passenger seat back.

To secure the housing in the vehicle, the front of the housing has a pair of loops 230 (FIG. 15) adjacent upper and lower ends thereof and which may be integrally molded with the housing or separately attached to the housing. Web belts 232 are passed through the loops and terminate at opposite ends in a fastener, for example, an adjustable belt fastener whereby the belt can be disposed about the upper portion of the passenger seat back. In order that the door may swing past the rear passenger seat, the housing is elevated relative to the vehicle floor. Thus, the housing may be suspended from and behind the passenger seat from the seat back by employing two belt and loop arrangements along the upper and lower front sides of the housing for securement about the passenger seat as illustrated in FIG. 13A. In this form, the lower edge of the cooler door is elevated above the lower end of the cooler housing to enable it to swing over the top of the rear seat similarly as illustrated in FIG. 13. The housing may also have a lower portion disposed in the well between the front passenger seat and the rear seat.

In an alternative form, the cooler 200 may be electrically operated and, accordingly, the coolant medium container 216 may be omitted with the space occupied thereby being taken up by additional refrigeration space or insulation, or both. By using a small fan inside the cooler and a thermoelectric module having a power cord which may draw energy from the cigarette lighter of a vehicle, a refrigeration unit may be provided. A portable refrigerator of this type is manufactured by Comtrad Industries, Midlothian, Va. Additionally, this unit may be used as a food warmer.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A portable cooler for use in a vehicle comprising:
    a generally rectilinear elongated housing having an opening, opposite elongated side walls, rear, bottom and top walls secured to said side walls, a front and a door pivoted to one of said side walls for pivotal movement about an axis generally parallel to said side walls between positions opening and closing said housing opening;
    a cooler compartment within said housing having a plurality of storage areas;
    a cooling medium container defining a cooling chamber between said housing side walls and said compartment for receiving a cooling medium and being movable relative to said housing;
    said container having an opening for receiving the cooling medium; and
    means disposed between said cooler compartment and said housing for thermally insulating said cooler compartment;
    said door, in said open position, enabling at least partial movement of said container through said housing opening;
    said housing having at least one fastener for facilitating securement of the housing to a vehicle seat, said fastener including a pair of loop straps spaced from one another and adjacent said top and bottom walls of said housing.

2. A cooler according to claim 1 wherein said compartment storage areas include a plurality of shelves.

3. A cooler according to claim 1 wherein one of said compartment storage areas is an ice cube container.

4. A cooler according to claim 1 wherein said compartment storage areas include a plurality of shelves and an ice bucket, said door opening and closing said compartment, said shelves and said ice bucket being carried by said compartment for movement between positions wholly within said compartment and at least partially outside of said compartment when said door lies in said open position.

5. A cooler according to claim 1 wherein said container comprises an insert movable from a position wholly within said housing and a position at least partially outside said housing.

6. A cooler according to claim 1 wherein said container has a transparent wall for viewing said cooling chamber and determining the quantity of the cooling medium in the container.

* * * * *